Patented Apr. 28, 1936

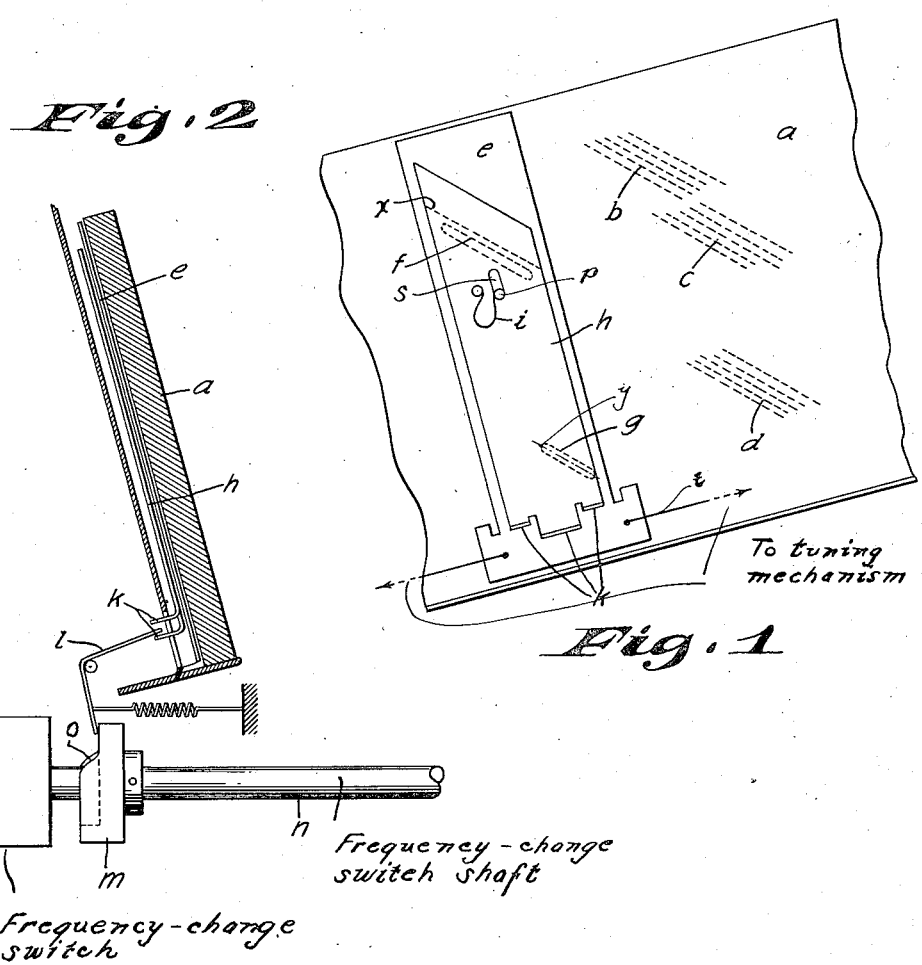

2,038,796

UNITED STATES PATENT OFFICE 2,038,796

DIAL ARRANGEMENT FOR BROADCAST RECEIVERS

Gustav Leifer, Berlin-Dahlem, and Otto Weeber, Berlin-Charlottenburg, Germany, assignors to Telefunken Gesellschaft für Drahtlose Telegraphie m. b. H., Berlin, Germany, a corporation of Germany Application May 7, 1934, Serial No. 724,306 In Germany May 22, 1933

3 Claims. (Cl. 116—124.1)

Modern broadcast receiver apparatus must have a wave range extending at least from 200 to 2,000 meters. This is not attainable by simple tuning means so that the scheme has been adopted to divide the above wave band into a properly so-called broadcast wave range and a long wave range. The changeover of the otherwise fixed inductance coils is effected by what is known as a wave change switch. The dial is also divided into two parts in accordance with the said two ranges of wave length. As a matter of fact, two dials are usually provided, one dial bearing the station names falling inside the broadcast wave band, and the other dial bearing the names of the stations transmitting on the long waves. The indicator device i. e., the pointer or pointer support, as a rule was made to pass over both scales simultaneously, and this leads often to errors in reading. In order to obviate this difficulty the suggestion has been made in the prior art to illuminate the dial by colored light such that on changing from one wave band to the other the color of the light was changed, with the result that only those station names became visible which had the corresponding color. But an arrangement of this kind is extremely complicated, while it involves this further drawback that the clearness of reading is impaired because of the reduced brightness of colored light.

According to this invention the above mentioned drawbacks are obviated by the aid of an arrangement in which in a given case only the particular pointer becomes visible which covers the wave range that has been set.

This is insured by disposing in front of the pointer itself a cover or closure plate which has apertures roughly of the form of the pointer and which is adapted to be shifted in front of the pointer in such a fashion that only one pointer will be visible depending upon the position of the wave switch.

The drawing shows one constructional solution of the invention by way of example, with such parts as are immaterial to explain the invention being omitted. Fig. 1 shows a view from the rear upon the dial support, while Fig. 2 is a section through the device.

In the figures $a$ is the dial support which is arranged upon the face or panel of the broadcast receiver set though slightly inclined rearwardly. It comprises a glass slab upon which the station names are inscribed in several rows, as indicated by Fig. 1. To facilitate the reading, the station names are arranged at an angle of 45 degrees. The rows $b$, $c$, contain the broadcast wave band, while row $d$ includes the long wave band. A sheet metal plate $e$ is mounted posteriorly of the dial $a$ in a shiftable manner. The plate $e$ may be caused to move from right to left, and vice versa, by the aid of a cord or cable $t$ which is connected with the tuning knob. The same plate $e$ has two slots $f$, $g$, which are also arranged at an angle of 45 degrees.

Posteriorly of the said plate $e$, is another plate $h$ on which the pointers or indicators are marked in the form of lines $x$ and $y$. The plate $h$ is capable of longitudinal displacement in reference to the plate $e$ by means of the pin $p$ affixed to the plate $e$ working in the slot $s$ formed in the plate $h$. By the provision of a spring mechanism $i$ the plate $h$ will assume one of its two terminal positions in reference to $e$ as shown in Fig. 1. In the second of its terminal positions the plate $h$ will be shifted downwardly by mechanism to be hereinafter described to a position such that the upper edge of the slot $s$ is brought to bear on the pin $p$. Now, the above mentioned indicator lines $x$ and $y$ are so disposed that in one position only one, and in the other position only the other one, becomes visible through convenient slots of the plate $e$. The shifting of the plate $h$ in reference to the plate $e$ is effected simultaneously with the actuation of the wave change means. The plate $h$ for this purpose is provided with three tongues or blades angularly bent away therefrom as indicated at $k$. Behind this arrangement, and along the dial, is an angularly bent sheet $l$ which is pivoted at the bend or the apex of the angle and is laterally supported at the ends of the dial. One limb of the member $l$ is positioned between the angularly bent or offset tongues $k$ of the said plate $h$ while the other one is pressed against a disk or cam member $m$ by means of spring pressure. The said disk is seated upon the spindle $n$ of the wave switch and is capable of being rotated conjointly therewith. One face $o$ of the disk $m$ is non-planar, in fact, it is so formed that upon rotation of the spindle of the wave change switch, one leg of the sheet metal strip $l$, in opposition to the force of the spring, comes to be pressed towards the left hand side. As a result the other leg at the same time is pressed downwardly, and in this manner the plate $h$ is entrained. A transmission mechanism constructed as hereinbefore described is necessary in order that the pointer support may be capable of being changed at each place of the scale in the same manner.

By an analogous application of this form of construction and principle to an arrangement in which the pointer is stationary, while the dial corresponding to the wave band that has been set becomes visible in the rear of an opening, the identical advantages are feasible.

What we claim is:

1. A station indicator device for radio apparatus provided with tuning mechanism capable in conjunction with a frequency-change switch of tuning the apparatus through a plurality of frequency ranges, comprising a stationary scale member having several groups of station indications marked thereon corresponding to the number of frequency ranges, said station groups being vertically arranged, and an indicator device longitudinally movable under control of the tuning mechanism and vertically movable under control of the frequency-change switch.

2. A station indicator device according to claim 7, wherein said device comprises a pair of superposed plates, one of which is provided with reference marks equal in number to the frequency ranges and the other of which is provided with corresponding slots, the position of the frequency-change switch determining which one of the frequency marks is to be viewable through its associated slot.

3. A station indicator device for radio apparatus provided with tuning mechanism capable in conjunction with a frequency-change switch of tuning the apparatus through a plurality of frequency ranges, comprising a stationary scale member having several groups of station indications marked thereon corresponding to the number of frequency ranges, a member having a plurality of apertures equal in number to the groups of station indications and movable along the scale member under the control of the tuning mechanism, and means having as many indicators as there are apertures carried by said apertured member and movable in a vertical direction with respect thereto under the control of the frequency-change switch, the arrangement being such that in any particular position of the frequency-change switch the means vertically movable with respect to the apertured member assumes such position that only one of its indicators is viewable through an aperture and adjustment of the tuning mechanism operates to position one of the station indications of the group corresponding to the setting of the frequency-change switch in alignment with the indicator viewable through the aperture.

GUSTAV LEIFER.
OTTO WEEBER.